3,023,170
PROCESS FOR REDUCING THE SURFACE ACTIVITY OF COMPOUNDS IN AQUEOUS MIXTURES
Carl B. Linn, Riverside, Ill., assignor, by mesne assignments, to Universal Oil Products Company, Des Plaines, Ill., a corporation of Delaware
No Drawing. Filed Jan. 19, 1959, Ser. No. 787,341
10 Claims. (Cl. 252—321)

This invention relates to a method for depressing the emulsification and foaming tendencies of substances in aqueous solution and more particularly concerns a means for counteracting the surface activity of certain organic compounds in admixture with water or in aqueous solution by adding to the latter a foam and emulsion retardant comprising an arylated carbohydrate, hereinafter more specifically characterized.

The class of compounds herein referred to as arylated carbohydrates act specifically as foam and emulsion retardants or dispersants in liquid systems generally, particularly in aqueous mixtures containing organic compounds which tend to produce foam or emulsions when the aqueous phase is mixed or otherwise agitated in the presence of the organic compound, although diminution of the foaming and emulsion-forming tendencies of other types of compounds is also feasible by adding thereto the present arylated carbohydrate anti-surface active agent. Thus, in the petroleum and glycerine oil refining industries, emulsions of the oil and water or oil and salt water (generally removed from the oil-bearing strata as an emulsion with the petroleum stock) are commonly observed in the recovery, purification, or treatment of such oil fractions. These emulsions present difficult material-handling problems because of their stability and the difficulties associated with the treatment and the separation of the oil from these emulsions, as for example, in heating the raw material to effect distillation thereof. Indeed, in many instances no effective means of breaking such emulsions has been devised, particularly for petroleum hydrocarbon-salt water emulsions present in crude petroleum removed from underground oil wells. The problem of foam formation has become associated with a variety of processes, particularly in processes involving products or reactants which have a certain degree of surface activity. Foams are commonly observed in stirring and aerating operations and particularly in distilling mixtures of components containing a foam-imparting ingredient, the vaporized liquid or gas introduced into the mixture causing the formation of more or less stable bubbles in the liquid undergoing aeration, distillation, etc. Thus, in the distillation of certain petroleum crudes containing phenolic and/or sulphur-containing components, foaming is observed when vapor begins to form in the distillation apparatus. The resulting foam complicates the distillation due to entrainment of liquid foam in the effluent vapors leaving the distillation column, resulting in less decisive separation of the distillate fractions as well as resulting in the appearance of undesirably colored bottoms material in the distillate fractions. Another instance in which foaming represents an undesirable condition is in the production of steam from naturally occurring sources of water, such as untreated well water containing appreciable quantities of carbonates and bicarbonates normally tending to decompose to yield carbon dioxide when heated, as in the boilers of a steam generating plant.

The present arylated carbohydrate compounds, herein characterized as the condensation products of aromatic compounds with carbohydrates, when incorporated into such aqueous mixtures, either before or after emulsion or foam formation, preferably in an amount of from about 0.001 to about 10% by weight of the mixture subject to foaming, effectively represses the formation of foam or emulsion in the system or disperses the foam or emulsion in a system in which foaming or emulsion formation has already taken place.

In one of its embodiments this invention relates to a method of diminishing the surface activity of a substance which in solution in a liquid tends to cause said liquid to foam or form an emulsion which comprises adding to the liquid an anti-foam and anti-emulsion agent consisting of an arylated carbohydrate in an amount of from about 0.001 to about 10% by weight of the liquid.

A more specific embodiment of the present invention relates to a process for reducing foam and emulsion formation in a liquid which comprises adding to and mixing with said liquid a tolylglucitol, in an amount of from about 0.01 to about 1% by weight of said liquid.

The arylglucitols comprising the present anti-foam and anti-emulsion formation additive for liquids which in their normal state tend to foam or which in the presence of water tend to form an emulsion are synthetic materials formed by the condensation of an aromatic compound selected from the hydrocarbons, phenols, thiophenols, nitriles, etc. with a carbohydrate in the presence of an acid-type catalyst and at condensation reaction conditions which result in the formation of a mono- or polyaryl-desoxyglucitol. The condensation of a carbohydrate with an aromatic compound containing a replaceable hydrogen atom has the following structural formula:

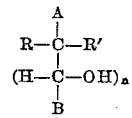

in which each of the Groups A and B is a member selected from hydrogen and methylol

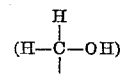

$n$ is an integer from 1 to 4, R represents a member of the group consisting of aryl and alkylaryl, including mono- and bicyclic aromatic and alkyl aromatic monovalent hydrocarbon groups, such as phenyl, tolyl, naphthyl, etc. or a mono- or bicyclic monovalent aromatic nucleus substituted with other radicals, such as hydroxyphenyl or salicyl radical, and R' is a radical selected from hydrogen, aryl and alkylaryl. Further details of the process of preparation and the structure of the preferred glucitol products of such condensation reactions will be explained in greater detail in the following description.

Suitable aromatic compounds utilizable as arylating agents in the condensation reaction to form the arylglucitols include such monocyclic aromatics such as benzene, toluene, one or more of the xylene isomers, ethylbenzene, a trimethylbenzene, an ethyltoluene, normal propylbenzene, cumene, etc. Higher alkyl aromatic hydrocarbons may also be employed in the condensation reaction with the carbohydrate reactant, although the yield of the condensation product tends to be less as the length of the alkyl chain increases because of the interference of the alkyl group with the condensation reaction. Other suitable aromatic hydrocarbons utilizable as the aromatic reactant of the present condensation include aromatic hydrocarbons having two or more aryl groups such as diphenyl, diphenylmethane, fluorene, etc. of the monocyclic types and hydrocarbons containing binuclear aryl groups such as naphthalene.

Although aromatic hydrocarbons constitute the preferred arylating agents in the production of the aryl-substituted carbohydrate additive of this invention, other alkylatable, non-hydrocarbon aromatic compounds also provide a suitable source of the aryl group. The latter compounds, however, are not necessarily of the same degree of effectiveness as the hydrocarbon alkylating agents, since hydrocarbon groups possess the maximum degree of hydrophobicity and in general, impart the maximum degree of anti-surface activity to the present additive. Typical of such other classes of aryl compounds which provide a useful source of the hydrophobic aryl group include hydoxy-substituted, carboxy-substituted, cyano-substituted, sulfhydryl-substituted and nitro-substituted aryl nuclei, as well as heterocyclic sulfur compounds, such as phenol, cresol, benzoic acid, salicylic acid, benzonitrile, thiophenol, nitrobenzene, dinitrobenzene, thiophene, etc.

Carbohydrates suitable for use in the condensation reaction to form the present glucitol anti-foam and emulsion retardant additives include the simple sugars, their desoxy and omega carboxy derivatives, compound sugars and oligosaccharide and the polysaccharides. The simple sugars include dioses, trioses, tetroses, pentoses, hexoses, heptoses, octoses, nonoses and decoses. Compound sugars include disaccharides, trisaccharides and tetrasaccharides. Typical simple sugars utilizable in the present condensation reaction include the dioses, such as glycolaldehyde; the trioses such as glyceraldehyde and s-dihydroxy acetone; tetroses such as erythrose, threose, erythrulose and apiose; the pentoses such as arabinose, xylose, ribose, lyxose, rhamnose (a desoxyhexose), a fucose (a desoxyhexose), rhodeose, digitalose, and ketoxylose; the hexoses, such as mannose, glucose, idose, gulose, galactose, talose, allose, altrose, fructose, sorbose, tagatose, and psicose; heptoses such as glucoheptulose, and perseulose; octoses such as gluco-octose, manno-octose, and galacto-octose; nonoses such as glucononose, and mannononose; and decoses such as glucodecose. Desoxy derivatives of simple sugars are formed by the replacement of an hydroxyl substituent in a sugar with hydrogen, thereby forming a methyl or methylene linkage. The desoxy pentoses and desoxyhexoses are the most commonly occurring of such compounds. The omega-carboxy derivatives of simple sugars, which are suitable in the process of the present invention include tartronic semi-aldehyde or its tautomer, hydroxypyruvic acid, δ,γ-dihydroxyacetoacetic acid, threuronic acid, 4-keto-2,3,5-trihydroxypentanoic acid, xyluronic acid, 5-keto-hexanoic acids such as 5-keto-allonic acid, 5-keto-gluconic acid, 5-keto-mannonic acid, 5-keto-gulonic acid, and 5-keto-galactonic acid, uronic acids such as glucuronic acid, mannuronic acid and galacturonic acid, and the 6-keto-heptanoic acids. The simple sugars and their omega-carboxy derivatives, as starting materials for the process of this invention, may be represented by the following general formula:

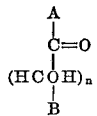

in which A is selected from hydrogen and $CH_2OH$, $n$ is an integer having a value from 1 to about 12, and B is selected from monovalent hydrogen, $CH_2OH$, and COOH radicals. Thus, when A and B are hydrogen and $n$ is equal to 1, the compound then represented is glycolaldehyde; when A=H, $n$=1, and B=$CH_2OH$, the compound is glyceraldehyde; when A=H, $n$=1, and B=COOH, the compound is tartaronic semialdehyde; when A=$CH_2OH$, $n$=1, and B=H, the compound is s-dihydroxyacetone; etc.

Ketose sugars which may be used in the condensation reaction with aryl compounds of the aforementioned character to produce mono- or diaryl desoxy ketitols, one of the classes of condensation products useful as anti-foam or emulsion retardant additives of this invention, are monosaccharides and according to their chemical structure are also hydroxymethanes, being referred to as trioses, tetroses, pentoses and the like, depending upon the number of oxygen atoms present in their structure. These ketoses have the general formula: $C_nH_{2n}O_n$ in which $n$ generally has a value of from 3 to about 8. Thus, these ketoses can all be regarded as polymers of formaldehyde $(CH_2O)_n$. The diarylated ketoses or diaryldesoxy-ketitols may also be prepared from aromatic hydrocarbons and polysaccharides which yield ketose units on hydrolysis. Such polysaccharides include sucrose, inulin, puranose, raffinose, gentianose, melezitose, stachyose, and berbascose.

The utilizable oligosaccharides or compound sugars include disaccharide such as the pentose-hexose saccharides, including glucoapiose, vicianose, and primeverose; the methylpentose-hexose saccharides, including glycorhamnoside, and rutinose; and the dihexoses such as turanose, maltose, lactose, cellobiose, gentiobiose, melibiose, sucrose, and trehalose. Other compound sugars are represented by the trisaccharides such as the methylpentose-hexose saccharides, including rhamninose, and robinose; the trihexose saccharides such as mannotriose; and the trihexoses, including raffinose melezitose, and gentianose. An example of a suitable tetrasaccharide is stachyose.

Various polysaccharides may also be arylated with an aromatic compound to produce glucitols useful as foam and emulsion retardants in the process of the present invention. These polysaccharides include pentosans such as araban, methylpentosans such as fugosan, the hexosans, such as starch, cellulose, glycogen, inulin, mannan, galactan, lichenin, levan, dextran, and laminarin. All of the above polysaccharides are composed of one type of sugar residue. Other polysaccharides which are composed of more than one type of sugar unit such as the pentosans, like araboxylan and the hexosans like galactomannan may also be used. Other utilizable polysaccharides are represented by those composed of uronic acid units such as pectic acid and alginic acid; those composed of aldose (pentose or hexose) and uronic acid units, such as gum arabic, damson gum, gum tragacanth, linseed mucilage, pectins, and those containing hexose units esterified with an inorganic acid such as certain seaweed polysaccharides, like agar.

The acid-type alkylation catalyst which is specified for effecting the condensation between the aromatic compound and the carbohydrate is preferably substantially anhydrous hydrogen fluoride, although hydrofluoric acid containing up to about 15% by weight of water may also be utilized as catalyst. The hydrogen fluoride may also be further diluted with various inert diluents when it is desirable to effect the alkylation with low hydrogen fluoride concentrations on an anhydrous basis. Suitable inert diluents include perfluoro derivatives of paraffinic hydrocarbons such as perfluoropropane, perfluoro-n-butane, perfluoro-n-pentane, perfluoro-n-hexane, etc.

The alkylation or condensation of the aforementioned carbohydrates with the aromatic compounds described above to form the desoxyglucitol component of the present additive composition may be carried out by reacting the aromatic compound with the carbohydrate or a related substance in the presence of the aforementioned hydrogen fluoride catalyst, and generally at temperatures of from about −10° to about +50° C. The pressure at which the reaction is carried out will vary with the reaction temperature used, the molar ratio of reactants, and hydrogen fluoride catalyst present, and the volume of the particular reactor utilized. While many of the condensation reactions may be carried out at substantially atmospheric pressure, it may be desirable in certain instances and with certain reactants to carry out the reaction at pressures up to 100 atmospheres or more. The reaction is conveniently effected by slowly adding the hydrogen fluoride catalyst to a stirred mixture of the aromatic compound and carbohydrate, or the reverse procedure may be followed by adding a mixture of the aromatic compound and carbohydrate to the hydrogen fluoride catalyst with adequate agitation while the reaction temperature is maintained at from about −40° to about 100° C. by suitable cooling and/or heating means. It is often advisable or desirable to commingle the reactants and the catalyst at a relatively low temperature such as from about −80° to about −30° C. and then permit the reaction mixture to warm gradually while the reactants and catalysts are stirred by suitable means, such as a motor-driven stirrer or other adequate mixing equipment. After the reaction has reached the desired degree of completion, the hydrogen fluoride catalyst is removed from the reaction mixture by distillation at atmospheric or lower pressure or by passing an inert gas through the reaction mixture while maintaining it at a relatively low temperature. Also, the entire reaction mixture and catalyst may be mixed with water or may be added to ice in order to quench the activity of the hydrogen fluoride catalyst and permit separation of the organic reaction products and unreacted starting materials from the catalyst. The organic reaction products may also be separated from the resulting aqueous hydrogen fluoride formed by dilution of the reaction mixture with water by means of an organic solvent such as ether in which all or some of the organic material may be dissolved. Thus, the product formed by reacting toluene with glucose or cellulose in the presence of substantially anhydrous hydrogen fluoride at 30° C. is separated into and ether-soluble and water-insoluble product, and an ether-insoluble and water-soluble product.

The ratio of aromatic compound to carbohydrate charged to the condensation reaction is generally equimolar, although this ratio may vary from 0.1 to 10 to 1, if desired, ratios greater than 1 to 1 increasing the yield of diaryl carbohydrate condensation product resulting from the reaction.

The catalyzed reaction between carbohydrates and aromatic compounds can be extended to include, on the one hand, aromatic derivatives, included within the scope of the term "aryl" and "alkylaryl" as utilized herein, such as phenol, chlorobenzene, anisole, benzoic acid, salicylic acid, and the like, and on the other hand carbohydrate derivatives such as glucuronolactone, etc., the only limitation here being that a potentially free aldehyde or ketone group be present in the carbohydrate derivative. For example, the catalyzed interaction of glucose and toluene gives, among other products, pure organic materials having the following structures:

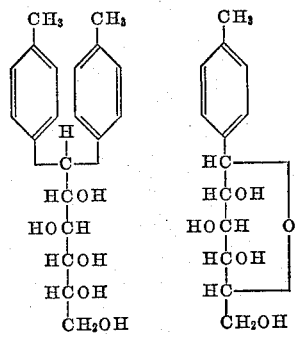

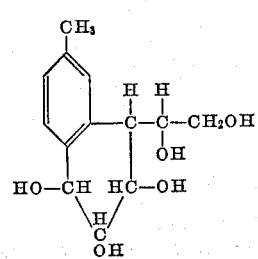

The catalyzed interaction of glucose and phenol gives, among others, pure reaction products having the following structures:

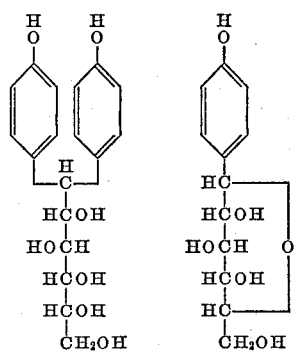

The catalyzed interaction of ethylbenzene and glucose gives, among others, reaction products having the following structures:

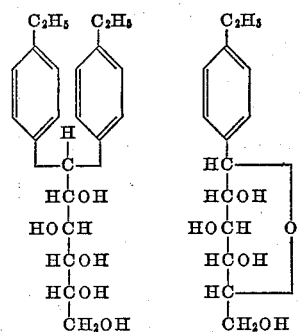

The catalyzed interaction of fructose and toluene gives, among others, pure reaction products having the following structures:

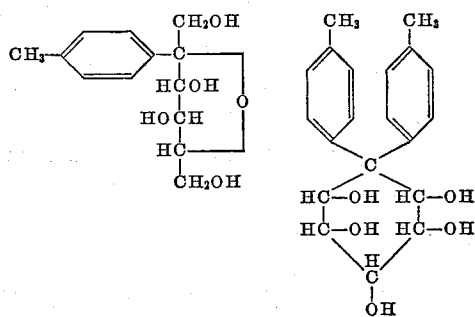

The catalyzed interaction of glucose and chlorobenzene gives, among others, pure reaction products having the following structures:

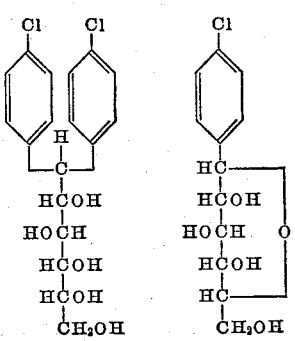

The catalyzed interaction of glucuronolactone with benzene gives, among others, reaction products having the following structures:

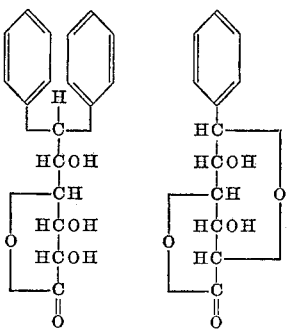

The catalyzed interaction of glucuronolactone with chlorobenzene gives, among others, reaction products having the following structures:

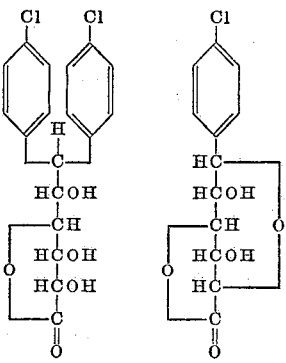

The above compounds may be obtained as pure crystalline materials in good yields as products of the appropriate reactions and each may be utilized in the form of its aqueous solution as the additive composition herein. In some cases the raw products consist of mixture of compounds which may require extraction or suitable chemical treatment for recovery of a particular component which may be more desirable than other components of the mixed product.

The mono- and polyarylglucitols hereinabove indicated and formed by the alkylation of a carbohydrate with an aryl compound are utilized as foam repressants and emulsion inhibitors by mixing the glucitol in the mixture normally subject to emulsification or foam formation, generally in an amount of from about 0.01 to about 1% by weight of the substrate, although quantities as low as 0.001% may be effective in certain instances and for certain purposes, while in other instances quantities up to 10% by weight of the substrate may be required in order to repress foam and emulsion formation. The additive may be incorporated into the substrate by the addition thereto of the aryl-glucitol in crystalline form, finely powdered form or in solution in a suitable solvent, such as acetone, an ether, an ester or other organic or inorganic material which solubilizes the glucitol and does not alter the properties of the substrate. Thus, for example, in the treatment of boiler water to reduce the tendency of the water to foam, the glucitol may be added directly to the boiler water in extremely small amounts, for example, in an amount of from about 0.001% to about 0.01% by weight of the boiler water. In other instances, the glucitol may be dissolved in a heavy oil or in one of the reactants involved in a system undergoing a conversion reaction, the additive thereafter becoming dispersed in the mixture during the course of the mixing operation. In still another method of application, the arylglucitol may be dissolved in a suitable solvent therefor and the resulting solution sprayed in droplets into or on the surface of the substrate which may have foam or emulsion present prior to treatment with the additive. In the latter application the emulsion or foam is rapidly dispersed after the additive is sprayed thereon and the aqueous and oil phases thereafter rapidly separated.

The present invention is further illustrated with respect to several of its specific embodiments in the following examples, which, however, are not intended to restrict the scope of the invention necessarily in accordance therewith.

*Example I*

A toluene alkylate of glucose from which a fraction soluble in hot water is separated is utilized as an anti-foam agent in a solvent extraction process employing an aqueous diethylene glycol solvent composition containing about 0.01% by weight of the toluene alkylate of glucose as the anti-foam additive thereto. In the absence of the foregoing glucose alkylate the solvent composition tends to foam profusely when utilized in a solvent extraction process as distillation conditions, accompanied by the generation of vapor in the solvent stripping stage of the process. The production of foam in the rich solvent stripping vessel was sufficient to result in the carryover of enough of the solvent composition to contaminate the recovered solute during the distillation. In order to eliminate such contamination, it was necessary to either redistill the extract product or to subject the same to a countercurrent water wash in a separate extraction column.

After the addition of 0.01% by weight of the monotoluene alkylate of glucose, however, the formation of foam on the glycol interface in the extraction zone was substantially eliminated, although the distillation was conducted at the identical conditions previously utilized in which foaming was noted. The extract product in each instance could be distilled from the rich solvent composition substantially without contamination of the recovered extract hydrocarbon with solvent composition. The production of a substantially pure extract distillate product without carryover of solvent composition from the distillation apparatus is thus dependent upon freedom of the solvent composition from any tendency to foam, to thereby eliminate entrainment of solvent with the vapors of overhead distillate. In the present run analysis of the overhead condensate indicated that neither solvent nor carbohydrate alkylate appeared in the receiver attached to the overhead condenser.

A similar negative tendency to foam is observed in flashing and stripping the rich solvent composition in the presence of 0.1% by weight of the solvent of the monoxylene alkylate of glucose and with mono- and diphenyl fructose.

*Example II*

The effectiveness of an arylglucitol as an anti-foam additive in a system which normally tends to foam profusely may be demonstrated by the addition of 0.02% by weight, and more effectively, 0.05 to 0.2% by weight of a mono- or di-xylenated glucose to an aqueous, 0.3% solution of sodium dodecyl benzene sulfonate, which in the absence of the anti-foam additive produces large quantities of suds upon agitating the aqueous solution. Thus, if to a 0.3% aqueous solution of the sulfonate is added 0.05% by weight of the di-xylene alkylate of glucose, no amount of agitation will cause the formation of suds in the aqueous mixture.

The additive (mono- or di-xylenated glucose) may be combined with a dry detergent which normally, in the absence of the additive foams profusely to form a dry detergent composition having surface activity, but which lacks capacity to foam, thus providing a product which retains its detergent property, but from which the troublesome foaming property has been removed. The additive may also be added in small quantities to the influent of sewage disposal plants to eliminate the foaming tendency of sewage liquids, which has become one of the major problems associated with the treatment of modern sewage containing appreciable quantities of modern detergents.

I claim as my invention:

1. A method of diminishing the surface activity of a substance which when distributed in an aqueous liquid tends to cause said liquid to foam or to form an emulsion which comprises adding to the liquid an aryldesoxyglucitol in an amount of from about 0.001% to about 10% by weight of the liquid.

2. The process of claim 1 further characterized in that said aryldesoxyglucitol is monoaryl-substituted.

3. The process of claim 1 further characterized in that said aryldesoxyglucitol is diaryl-substituted.

4. The process of claim 1 further characterized in that said aryldesoxyglucitol is an aryl-substituted hexose carbohydrate.

5. The process of claim 4 further characterized in that said hexose is glucose.

6. The process of claim 1 further characterized in that said aryldesoxyglucitol is an aryl-substituted polysaccharide.

7. The process of claim 6 further characterized in that said polysaccharide is sucrose.

8. The process of claim 1 further characterized in that said aryl group is derived from an aromatic hydrocarbon.

9. The process of claim 8 further characterized in that said aromatic hydrocarbon is toluene.

10. The process of claim 1 further characterized in that said aryl group is derived from an aromatic phenol.

References Cited in the file of this patent

Ross et al.: Inhibition of Foaming, article in Ind. and Eng. Chem., Vol. 36, pp. 570-573, June 1944.